United States Patent
Chisu et al.

(10) Patent No.: US 11,652,521 B1
(45) Date of Patent: May 16, 2023

(54) DYNAMIC TRANSMIT ANTENNA MODES OF OPERATION IN MULTI-TRANSMIT CARRIER SCENARIOS

(71) Applicant: MOTOROLA MOBILITY LLC, Wilmington, DE (US)

(72) Inventors: Daniel C Chisu, Franklin Park, IL (US); Si Chen, Chicago, IL (US); Armin W Klomsdorf, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 23 days.

(21) Appl. No.: 17/555,807

(22) Filed: Dec. 20, 2021

(51) Int. Cl.
*H04B 7/02* (2018.01)
*H04B 7/06* (2006.01)
*H04W 68/00* (2009.01)

(52) U.S. Cl.
CPC ........ *H04B 7/0608* (2013.01); *H04W 68/005* (2013.01)

(58) Field of Classification Search
CPC ............................ H04B 7/0608; H04W 68/005
USPC ................ 375/267, 262, 259, 219, 295, 316
See application file for complete search history.

(56) References Cited

U.S. PATENT DOCUMENTS

| 10,673,484 | B2 | 6/2020 | See et al. |
| 2020/0288431 | A1* | 9/2020 | Lee ........................ H04W 72/56 |
| 2021/0267005 | A1 | 8/2021 | Gopal et al. |

OTHER PUBLICATIONS

Qualcomm Technologies, Inc., MPSS.DE Antenna Switching Diversity (ASDiv) Overview, 80-NJ705-10 Rev. A, Jun. 9, 2021.

* cited by examiner

*Primary Examiner* — Zewdu A Kassa
(74) *Attorney, Agent, or Firm* — Isidore PLLC

(57) ABSTRACT

A communication device, computer program product, and method proactively implement a successful transmit antenna configuration to address antenna outages for multiple transmit carrier scenarios. A carrier of the communication device determines a first transmit carrier, of at least two transmit carriers of a multiple transmit carrier mode, that is identified as having priority among the at least two transmit carriers. The controller identifies one or more transmit antenna configurations in the transmit antenna configuration data that support the first transmit carrier. The carrier determining, for each transmit antenna configuration, an aggregate antenna outage metric that indicates the transmit performance for a corresponding transmit antenna configuration. The controller configures an antenna switching network and RF frontend of a communication subsystem of the communication device with a first transmit antenna configuration that has a better aggregate antenna outage metric than other antenna configurations.

20 Claims, 5 Drawing Sheets

DYNAMIC TRANSMIT ANTENNA MODES OF OPERATION IN MULTI-TRANSMIT CARRIER SCENARIOS

BACKGROUND

1. Technical Field

The present disclosure relates generally to communication devices, and more particularly to communication devices that switch antenna configuration for transmitting using multiple carriers.

2. Description of the Related Art

Developments in communication devices increasingly include concurrent transmission via antennas that are in close proximity. For example, in moving from fourth generation long term evolved (LTE) radio access technology (RAT) to fifth generation new radio (5G NR) RAT, communication devices typically have increased a number of transmit paths that operate simultaneously. A typical LTE communication device has a maximum of two transmitters that are simultaneously active, one LTE transmitter and one Wi-Fi transmitter. A 5G NR communication device can have up to two 5G NR transmitters in multiple input multiple output (MIMO) operation, one LTE transmitter, and two Wi-Fi transmitters in MIMO operation. 5G non-standalone (NSA) mode is an option for 5G NR deployment. NSA mode is also referred to as evolved UTMS radio access network and new radio dual connectivity (ENDC) or merely "dual connectivity". Dual connectivity refers to possible concurrent transmission by an LTE transmitter and by a 5G NR transmitter. The potential for negative interactions between these transmitters increases with the increased number of transmitters.

Conventionally, for concurrent transmission, communication devices select antennas individually that are determined to provide optimal radiation efficiency in the selected frequency band. However, the simultaneous transmission by multiple transmitters gives rise to negative interactions that include: (i) intermodulation distortion (IMD) products between transmitters that fall in active receive bands, causing self-desensitization that results in degradation of overall data transfer throughput; (ii) IMD products between transmitters that fall outside of receive bands of the communication device but result in spurious emissions levels above those permissible by standards bodies for maximum sensitivity degradation (MSD) and other communication regulations; and (iii) radio frequency (RF) radiation exposure to a human body that is above a regulatory limit. For frequencies below 6 GHz, the RF radiation exposure limits are defined for specific absorption rate (SAR). For frequencies above 6 GHz, the RF radiation exposure limits are defined for power density (PD) at the surface, since the short wavelength attenuates quickly when encountering tissue.

The simultaneous transmissions from each transmitter are additive. Increasing the number of transmitters increases the total RF radiation exposure. Currently, these negative interactions are managed by reducing power on one or more of the active transmit paths. Transmit power reduction has the negative consequence of reducing Total Radiated Power (TRP) and therefore reduces range and/or throughput on that transmission path. The negative consequences can be referred to as antenna outages that are inadequately addressed by conventional transmit antenna switching strategies.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
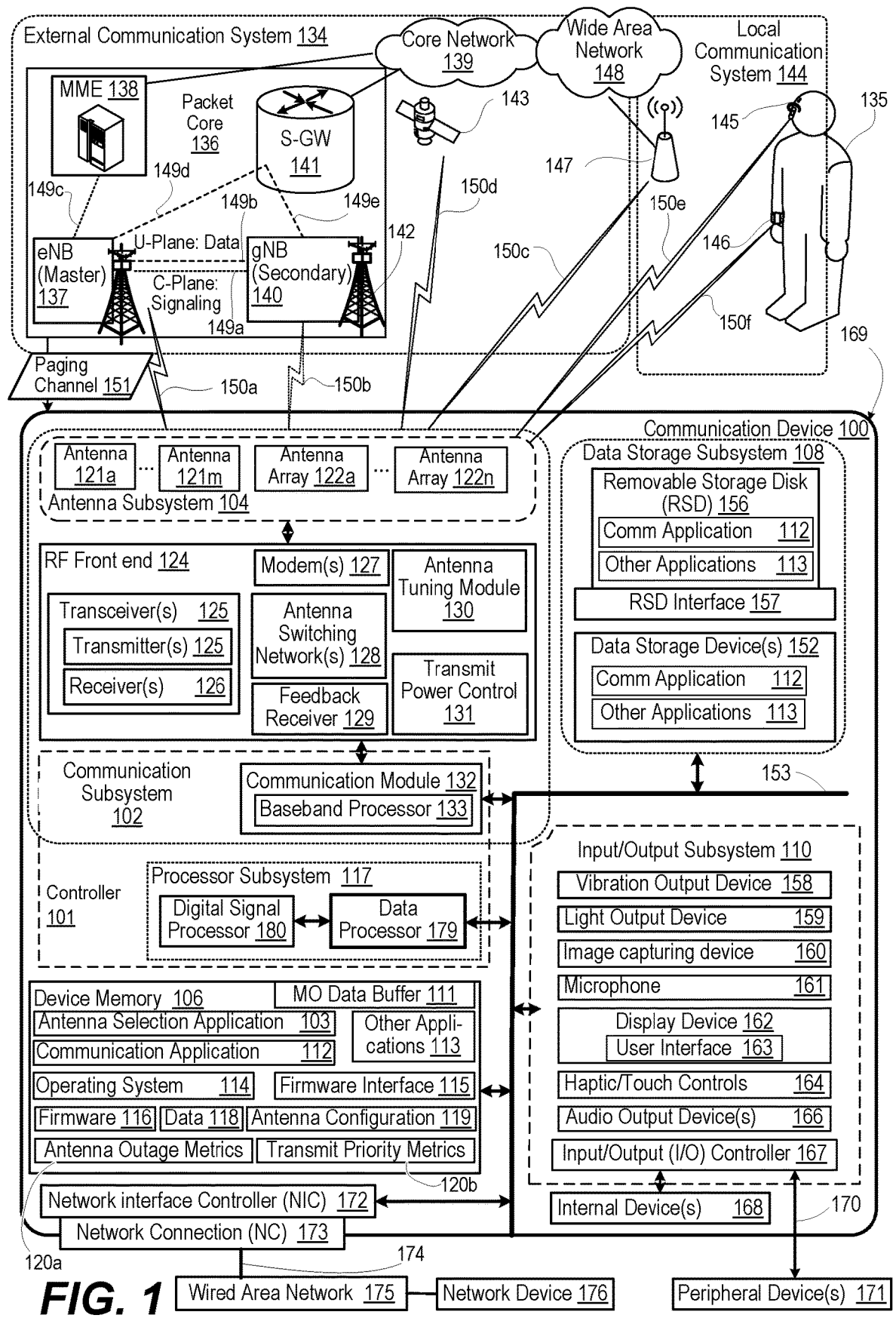
FIG. 1 depicts a functional block diagram of a communication environment including a communication device having components that evaluate a successful transmit antenna configuration to address antenna outages for a priority transmit carrier in a multiple transmit carrier scenario, and within which the features of the present disclosure are advantageously implemented, according to one or more embodiments.

According to a first aspect of the present disclosure, a communication device, a computer program product, and a method evaluate a successful transmit antenna configuration to minimize antenna outages for a priority transmit carrier in a multiple transmit carrier scenario. The communication device includes a communication subsystem having an antenna subsystem, a radio frequency (RF) frontend, and a communication module. The antenna subsystem includes two or more RF antennas that are communicatively connected to an antenna switching network. The RF frontend is communicatively connected to the antenna subsystem via the antenna switching network. The RF frontend has more than one modem configurable for one or more multiple transmit carrier modes. The communication module dynamically configures the antenna switching network, the RF frontend, and the antenna subsystem to communicate using the one or more multiple transmit carrier modes. The communication device includes a memory that stores transmit antenna configuration data; and a controller communicatively coupled to the communication subsystem and the memory. The controller determines a first transmit carrier, of at least two transmit carriers of a multiple transmit carrier mode, that is identified as having priority among the at least two transmit carriers. The controller identifies one or more transmit antenna configurations in the transmit antenna configuration data that support the first transmit carrier. The controller determines, for each transmit antenna configuration, an aggregate antenna outage metric that indicates the transmit performance for a corresponding transmit antenna configuration. The controller configures the communication subsystem with a first transmit antenna configuration that has a better aggregate antenna outage metric than other antenna configurations.

In one or more embodiments, the present disclosure provides a communication device operating in dynamic transmit modes of operation (antenna assignments). The communication device automatically determines best mode (s) to use which offers the least amount of transmit antenna outage based on assigning individual transmit antenna priorities. A priority-based scoring mechanism is used to prioritize individual transmit antennas for transmit antenna-switching candidacy, based on the factors defined in evaluation tables. The antenna switching enables operating the communication subsystem of the communication device in at least one of several modes of operation or aggregating between several modes (transmit antenna switch/swap, enable transmit diversity, combine transmit onto single antenna, or combinations of the modes). The communication device evaluates the modes for all carriers and transmit antennas. The evaluation may be triggered in response to predicting connectivity with the network, in order to determine the best transmit antenna configuration to be used in the connection.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an electronic device in an operating environment within which the features of the present disclosure are advantageously implemented. In particular, communication device 100, managed by controller 101, is an example of an electronic device having communication subsystem 102 that concurrently communicates on multiple transmission paths or carriers. According to one aspect of the disclosure, controller 101 executes antenna selection application 103, which optimizes performance of antenna subsystem 104 during concurrent transmissions. Communication device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In one or more embodiments, communication device 100 includes communication subsystem 102, device memory 106, data storage subsystem 108, and input/output (I/O) subsystem 110 that are each managed by controller 101. Device memory 106 includes program code for applications, such as antenna selection application 103, communication application 112 and other application(s) 113. Device memory 106 (memory 106) further includes operating system (OS) 114, firmware interface 115, such as basic input/output system (BIOS) or Uniform Extensible Firmware Interface (UEFI), and firmware 116.

Controller 101 includes processor subsystem 117, which executes program code to provide operating functionality of communication device 100 that optimizes antenna selection for multiple transmit carrier scenarios. The software and/or firmware modules have varying functionality when their corresponding program code is executed by processor subsystem 117 or secondary processing devices within communication device 100. Processor subsystem 117 of controller 101 can execute program code of antenna selection application 103, communication application 112, and other application(s) 113 to configure communication device 100 to perform specific functions. Device memory 106 can include data 118 used by the applications. Antenna selection application 103 references antenna configuration data 119 to determine antenna switching combinations that are available to support particular transmit carrier modes. Antenna selection application 103 calculates a sum or metrics using antenna outage metrics data 120a and transmit carrier priority metrics data 120b. With reference to antenna outage metrics data 120a, controller 101 determines antenna outages of antenna subsystem 104 by determining one or more of: (i) thermal status of antenna subsystem 104; (ii) form factor interference; (iii) user blocking; (iv) transmit power limit; (v) uplink block error ratio measurement; and (vi) a regulatory cutback. Transmit priority metrics data 120b stores transmit carrier priority data, which includes metrics assigned for one or more of: (i) bearer type; (ii) anchor type; (iii) application latency intensity; (iv) application throughput intensity; (v) quality of service class; (vi) and usage mode of packet data network. In one or more embodiments, controller 101 executes antenna selection application 103 to reference the transmit carrier priority data and determine the first transmit carrier, of at least two transmit carriers of the multiple transmit carrier mode, that is identified as having the priority among the at least two transmit carriers. Controller 101 further executes antenna selection application 103 to configure communication subsystem 102 to transmit and receive. In an example, communication application 112 places mobile originated (MO) data in MO data buffer 111 that awaits uplink transmission by communication subsystem 102.

Antenna subsystem 104 of communication subsystem 102 includes first antennas 121a-121n and second antennas 122a-122m that support various RF bands for wireless and cellular services. Unlike earlier generations of cellular services, where voice and data were handled using different radio access technologies (RATs), both are now integrated, with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. With wireless frequency spectrum seemingly ever expanding, additional antennas (121a-121m, 122a-122n) are incorporated to support newer RATs and multi band operation. Dual low band (2 L) or quad low band (4 L) multiple input multiple output (MIMO) operation dictates multiple antennas communicate on multiple bands simultaneously. In one or more embodiments, first antennas 121a-121n support lower frequency bands such as ultra-high band (UHB). Second antennas 122a-122m are array modules (ARMs) that support MIMO communication in higher frequency bands, such as millimeter Wave (mmWave).

Communication subsystem 102 includes RF frontend 123 having transceiver(s) 124 that includes transmitter(s) 125 and receiver(s) 126. RF frontend 123 further includes modem(s) 127, antenna switching network(s) 128, feedback receiver 129, antenna tuning module 130, and transmit power control 131. Two or more radio frequency (RF) antennas (121a-121m, 122a-122n) are communicatively connected to antenna switching network(s) 128. Communication subsystem 102 also includes communication module 132 having baseband processor 133. Baseband processor 133 communicates with controller 101 and RF frontend 123. In one or more embodiments, baseband processor 133 performs a primary or support function as part of controller 101.

Communication subsystem 102 communicates with external communication system 134. Baseband processor 133 operates in baseband frequency range to encode data for transmission and decode received data, according to a communication protocol. Modem(s) 127 modulate baseband encoded data from communication module 132 onto a carrier signal to provide a transmit signal that is amplified by transmitter(s) 125. Modem(s) 127 demodulates received signal(s) from external communication system 134 detected by antenna subsystem 104. The received signal is amplified and filtered by receiver(s) 126, which demodulate received encoded data from a received carrier signal.

Antenna tuning module 130 adjusts antenna impedance of antenna subsystem 104. Antenna tuning module 130 improves antenna efficiency at desired transmit or receive frequencies of transmitter(s) 125 and receiver(s) 126, respectively, within transceiver(s) 124. Antenna tuning module 130 is electrically coupled to antenna subsystem 104 and compensates for any lossy dielectric effect of being proximate to person 135. In one or more embodiments, first antennas 121a-121n and second antennas 122a-122m are individually tuned to selected RF bands to support different RF communication bands and protocols. First antennas 121a-121n and second antennas 122a-122m can be used in combination for multiple input multiple output (MIMO) operation for beam steering and spatial diversity. Subsets of first antennas 121a-121n and second antennas 122a-122m operate independently to support concurrent communication.

External communication system 134 includes packet core 136 that supports data streaming services for communication device 100 via public land mobile networks (PLMNs). Communication device 100 connects wirelessly or over the air (OTA) to evolved base node (eNB) 137 that supports long term evolved (LTE) RAT, which serves as the master node for control signaling and in some instances data transfer. eNB 137 is supported by mobility management entity (MME) 138 for control services such as authentication, connection handoffs, idle mode mobility, etc. MME 138 is a control interface to packet core network 139. When available and needed, communication device 100 connects wirelessly or OTA with 5G base node (gNB) 140 as the secondary node for data transfer. Control plane (C-plane) signaling occurs between communication device 100, eNB 137, MME 138, and gNB 140. User plane (U-plane) data transfer can occur between communication device 100, eNB 137, gNB 140, and serving gateway (S-GW) 141 of packet core network 139. eNB 137 and gNB 140 can be accessed via radio tower(s) 142. External communication system 134 can also include global positioning system (GPS) satellites 143.

In other applications, local communication system 144 can include localized or personal devices such as wireless headset 145 and smart watch 146. Local communication system 144 can further include access nodes 147 for wireless communication. Communication devices 100 can be provided communication services by one or more wide area networks 148 that are linked to access nodes 147.

Packet core 136 of external communication system 134 has internal communication channels. eNB 137 communicates via a wired or wireless channel 149a with gNB 140 for C-plane signaling. eNB 137 communicates via a wired or wireless channel 149b with gNB 140 for U-plane data transfer. eNB 137 communicates via a wired or wireless channel 149c with MME 138 for C-plane signaling. eNB 137 communicates via a wired or wireless channel 149d with S-GW 141 for U-plane data transfer. gNB 140 communicates via a wired or wireless channel 149e with S-GW 141 for U-plane data transfer.

Communication subsystem 102 communicates with eNB 137 via uplink/downlink channels 150a. Communication subsystem 102 communicates with gNB 140 via uplink/downlink channels 150b. Communication subsystem 102 communicates with access node 147 via transmit/receive signals 150c. Communication subsystem 102 receives satellite broadcast signals 150d from GPS satellites 143. Communication subsystem 102 communicates with wireless headset 145 via transmit/receive signals 150e. Communication subsystem 102 communicates with smart watch 146 via transmit/receive signals 150f. One of eNB 137 and gNB 140 can transmit paging channel 151 that indicates that mobile terminated (MT) data is awaiting download transmission to communication device 100. In another example of preparation for communication with external communication system 134, controller 101 monitors radio resource control (RRC) state transitions between communication subsystem 102 and network node (e.g., eNB 137 or gNB 140). In response to determining that the RRC state is transitioning from an inactive state to an active state, controller 101 triggers the determining of the aggregate antenna outage metric that indicates the transmit performance for each transmit antenna configuration in preparation for a connection by communication subsystem 102.

In one or more embodiments, controller 101, via communication subsystem 102, performs multiple types of cellular OTA or wireless communication with external communication system 134. Communication subsystem 102 can communicate via Bluetooth connection with one or more personal access network (PAN) devices, such as wireless headset 145 and smart watch 146. Communication via Bluetooth connection includes both transmission and reception via a Bluetooth transceiver device. In one or more embodiments, communication subsystem 102 communicates with one or more locally networked devices via a wireless local area network (WLAN) link provided by access node 147. In one or more embodiments, access node 147 supports communication using one or more IEEE 802.11 WLAN protocols. Access node 147 is connected to wide area network 148, such as the Internet. In one or more embodiments, communication subsystem 102 communicates with GPS satellites 143 to obtain geospatial location information.

Data storage subsystem 108 of communication device 100 includes data storage device(s) 152. Controller 101 is communicatively connected, via system interlink 153, to data storage device(s) 152. Data storage subsystem 108 provides applications, program code, and stored data on nonvolatile storage that is accessible by controller 101. For example, data storage subsystem 108 can provide a selection of applications and computer data such as antenna selection application 103, communication application 112 and other application(s) 113 that rely on communication via communication subsystem 102. These applications can be loaded into device memory 106 for execution by controller 101. In one or more embodiments, data storage device(s) 152 can include hard disk drives (HDDs), optical disk drives, and/or solid-state drives (SSDs), etc. Data storage subsystem 108 of communication device 100 can include removable storage device(s) (RSD(s)) 156, which is received in RSD interface 157. Controller 101 is communicatively connected to RSD 156, via system interlink 153 and RSD interface 157. In one or more embodiments, RSD 156 is a non-transitory computer program product or computer readable storage device. Controller 101 can access RSD 156 or data storage device(s) 152 to provision communication device 100 with program code, such as code for antenna selection application 103, communication application 112, and other application(s) 113.

I/O subsystem 110 includes user interface components such as vibration output device 158, light output device 159, image capturing device(s) 160, microphone 161, display device 162 that presents user interface 163, touch/haptic controls 164, and audio output device(s) 166. Display device 162 is communicatively coupled to controller 101 and presents a user interface and/or operates as a user interface device. Controller 101, in response to determining that the user interface device (display device 162) is transitioning from an inactive state to an active state, triggers the determining of the aggregate antenna outage metric, which indicates the transmit performance for each transmit antenna configuration in preparation for a connection by communication subsystem 102. In an example, image capturing device(s) 160 are front and back cameras. In another example, image capturing device(s) 160 are on the same side but have different lenses such as two different ones of telephoto, wide angle, macro, or general-purpose lenses. I/O subsystem 110 also includes I/O controller 167. I/O controller 167 provides communication and power signals to functional components described herein as part of device memory 106, communication subsystem 102, data storage subsystem 108, or I/O subsystem 110. I/O controller 167 connects to internal devices 168, which are internal to housing 169, and via electrical cable 170 to tethered peripheral devices 171, which are external to housing 169 of communication device 100. Internal devices 168 include computing, storage, communication, or sensing components depicted within housing 169. I/O controller 167 supports the necessary configuration of connectors, electrical power, communication protocols, and data buffering to act as an interface between internal devices 168 and peripheral devices 171 and other components of communication device 100 that use a different configuration for inputs and outputs.

In one or more embodiments, I/O subsystem 110 includes network interface controller (NIC or "network interface") 172 with a network connection (NC) 173. Network cable 174 connects NC 173 to wired area network 175. NIC 172 can be referred to as a "network interface" that can support one or more network communication protocols. Wired area network 175 can be a local area network (LAN), a campus area network (CAN), a metropolitan area network (MAN), or a wide area network (WAN). For example, NC 173 can be an Ethernet connection. Network device 176 is communicatively coupled to wired area network 175.

Controller 101 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 101 includes processor subsystem 117, which includes one or more central processing units (CPUs), depicted as data processor 179. Processor subsystem 117 can include one or more digital signal processors 180 that are integrated with data processor 179. Processor subsystem 117 can include other processors that are communicatively coupled to data processor 179, such as baseband processor 133 of communication module 132. In one or embodiments that are not depicted, controller 101 can further include distributed processing and control components that are external to housing 169 or grouped with other components, such as I/O subsystem 110. Data processor 179 is communicatively coupled, via system interlink 153, to device memory 106. In one or more embodiments, controller 101 of communication device 100 is communicatively coupled via system interlink 153 to communication subsystem 102, data storage subsystem 108, and I/O subsystem 110.

System interlink 153 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 153 are illustrated in FIG. 1, it is to be understood that more, fewer, or different interconnections may be present in other embodiments.

Figure 2:
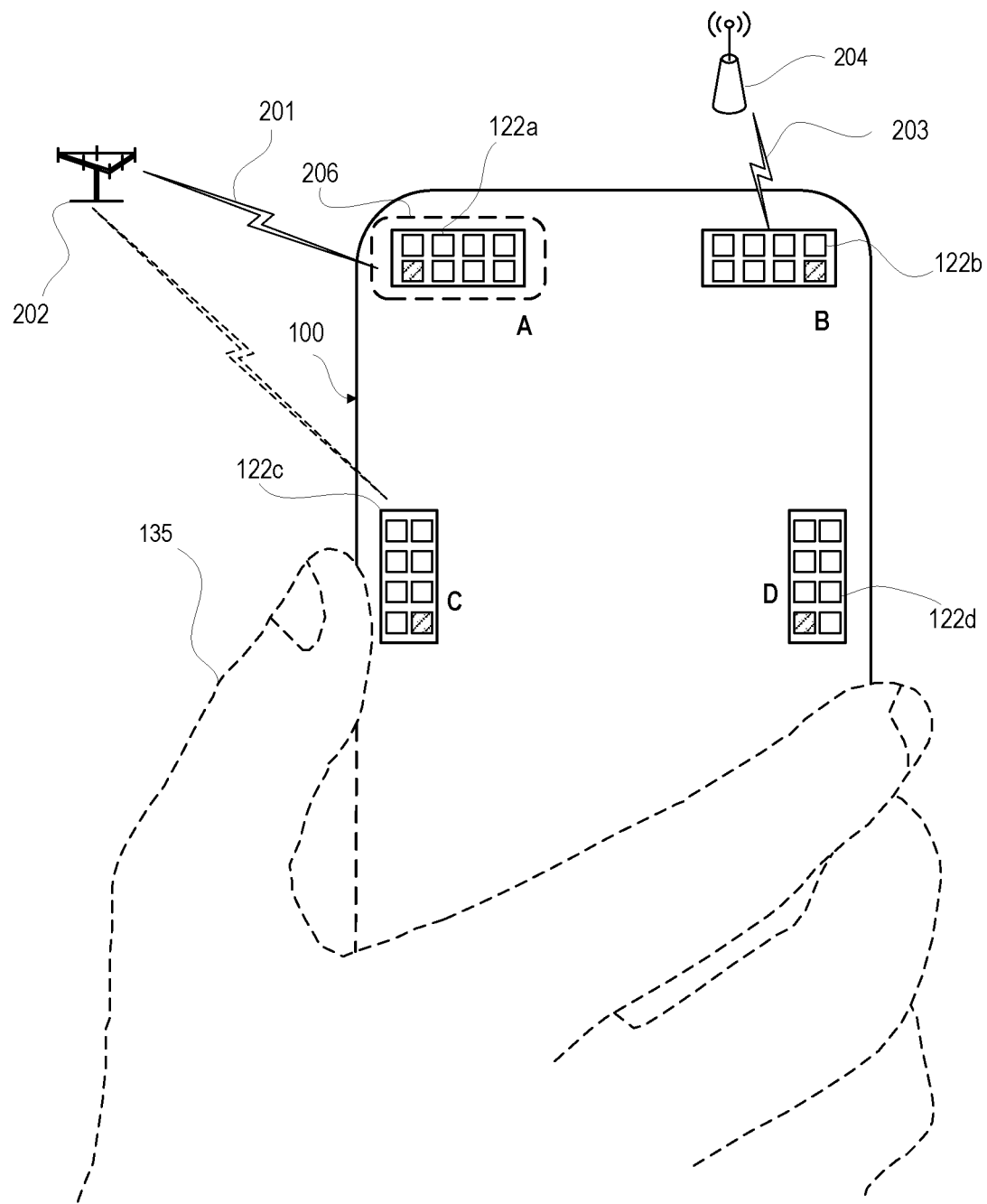
FIG. 2 depicts an example communication device having an antenna subsystem that includes four antenna array modules that support multiple transmit carrier scenarios in higher frequency bands, according to one or more embodiments.

FIG. 2 depicts example communication device 100 having antenna subsystem 104 that includes four antennas 122a-122d, which are array modules that transmit communication in higher frequency bands such as mmWave. Communication device 100 is in a multiple transmit carrier scenario, operating in a selected mode from among: (i) evolved universal terrestrial radio access network and new radio dual connectivity (ENDC); (ii) new radio intra-band uplink carrier aggregation (NR UL CA); (iii) new radio (NR) and IEEE-802.11 wireless; (iv) multi subscriber identity module (MSIM); (v) dual subscriber identity module dual active (DSDA); (vi) new radio dual connectivity (NRDC); and (vii) NR-E-UTRA dual connectivity (NEDC) with NR as anchor and LTE as secondary cell group (SCG). In an example, antenna 122a is being assigned to transmit uplink 201 to base node 202 concurrently with antenna 122b transmitting uplink 203 to access node 204. One or both of the device's form factor or user positioning relative to the device 100 (i.e., relative location and/or hand grip of person 135) creates an antenna outage, in particular blocking of antenna 122c. Another antenna 122a is positioned as an alternate selection to transmit uplink 201. As a result of block of antenna 122c, another antenna outage occurs by creating over-reliance on antenna 122a. In particular, antenna 122c is experiencing thermal status of over-temperature area 206 due to operating over close to a maximum power (Pmax) level for an extended period. An antenna outage can also occur because of a regulatory transmit limit in a particular frequency band when in proximity to person 135. Antenna 122d is not being used as being positioned with an antenna coverage area that is not directable toward either base node 202 or access node 204. As a result, antenna 122d is evaluated as having an antenna outage due to a high block error rate (BLER) that would be experienced if attempting to communicate with either base node 202 or access node 204.

Figure 3:
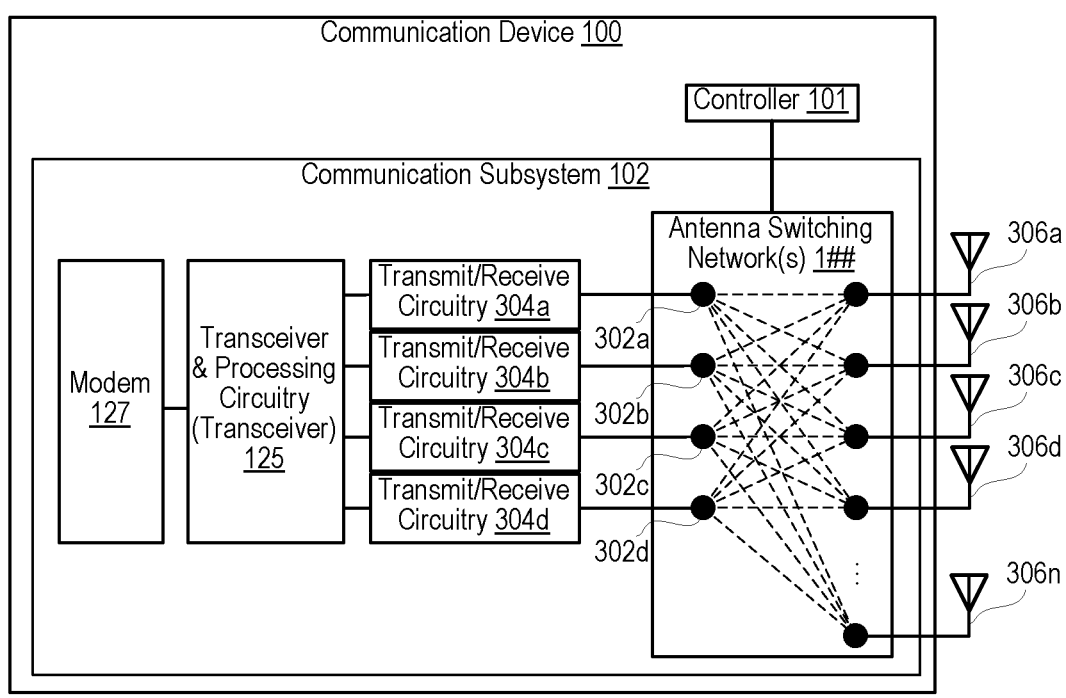
FIG. 3 depicts a functional block diagram of the communication subsystem of the communication device of FIGS. 1-2 that switches uplink antenna assignments based on evaluation of antenna outages and transmit carrier priorities, according to one or more embodiments.

FIG. 3 depicts a functional block diagram of communication subsystem 102 of communication device 100 that switches uplink antenna assignments based on evaluation of antenna outages and transmit carrier priorities. Modem 127 supports concurrent multiple transmit carrier scenarios, providing each transmit channel to transceiver and processing circuitry ("transceiver") 125 that produces four uplink channels 302a, 302b, 302c, and 302d through respective transmit/receive circuitry 304a, 304b, 304c, and 304d. Controller 101 switches one or more of uplink channels 302a-302d to an assigned transmit antenna 306a, 306b, 306c, . . . 306n.

In multi-transmit carrier or multi-connectivity scenarios, the present disclosure provides improved uplink performance first by prioritizing transmit carriers and then by evaluating transmit antenna configurations that support the prioritized transmit carriers having minimized antenna outages. The transmit antenna selection considers communication performance, battery life, and user experience in support of increasingly complex communication system requirements. The present disclosure can be extended to more than two concurrent transmit carriers by taking into consideration new device types, form factors (e.g., "candy bar or folding form factor), and new use cases associated with new applications. The uplink path is provided a more intelligent management of antenna assignments in order to ensure the best end user experience even though wireless communication links are in most cases uplink limited. Typically, the number of uplink antennas provided is far less than the number of downlink antennas provided.

According to one or more aspects, the present disclosure provides for improving uplink performance of a mobile communication device operating in multi-transmit carrier scenarios by evaluating possible transmit antenna outages on a carrier and transmit antenna basis. With the evaluation information, the present disclosure provides selecting the best antenna assignment for the highest priority transmit carrier that offers the least amount of antenna outage. The valuation process involves two areas: (i) The determination of evaluating a transmit antenna outage is based on several transmit-impacting factors (metrics) that can either be predetermined or inferred; and (ii) The determination of transmit carrier priority is based on several carrier-related factors. Together, a priority-based scoring mechanism is used to prioritize individual transmit antennas for transmit antenna-switching candidacy. Once priorities are determined in these two areas, an evaluator function (antenna switching application 103 (FIG. 1)) decides the most suitable antenna configuration from a set of possible antenna configurations, which include: (a) transmit antenna switch/swap; (b) enable transmit diversity; (c) combine transmit onto a single antenna; or (d) combinations of two or three of the configurations. Lastly, an antenna assignment takes place if at least one viable configuration is determined to reduce the transmit antenna outage for a highest priority transmit carrier. In addition to being triggered in multi-transmit carrier scenarios, the present disclosure provides optimizing antenna assignments before a communication connection with the network becomes active. Predictions of the communication connection may be triggered by monitoring radio resource control (RRC) state transitions, paging channel for mobile terminated (MT) data, data queues at communication application 112 executed by communication device 100 (FIG. 1) for mobile originated (MO) data, or display wake-ups.

TABLE A depicts an example transmit antenna outage evaluation form: for a particular transmit antenna configuration, a sum or metrics is obtained for one or more antenna outages, such as by assigning either a "1" or a "0". The highest score is the highest antenna outage score.

TABLE A

| Metric | Determine Tx Antenna Outage | Example |
|---|---|---|
| Thermal status | 1 if over temperature | T × 1 = 0 |
|  | 0 if temperature in | T × 2 = 0 |
|  | acceptable range | T × 3 = 0 |
| Form factor or user blocking antenna | 1 if compromised/blocked | T × 1 = 0 |
|  | 0 if not compromised/blocked | T × 2 = 1 |
|  |  | T × 3 = 0 |
| Tx power | 1 if within 3 dB of Pmax 50% of time | T × 1 = 0 |
|  | 0 if otherwise | T × 2 = 1 |
|  |  | T × 3 = 0 |
| UL block error ratio (BLER) | 1 if UL BLER × % | T × 1 = 0 |
|  | 0 if otherwise | T × 2 = 1 |
|  |  | T × 3 = 0 |
| SAR cutback | 1 if > 5 dB cutback | T × 1 = 1 |
|  | 0 if < 5 dB cutback | T × 2 = 0 |
|  |  | T × 3 = 0 |
| Sum of Metrics | Highest Score = Highest antenna outage | T × 1 = 1 |
|  |  | T × 2 = 3 (highest priority) |
|  |  | T × 3 = 0 (lowest priority) |

For row 1, the metric is thermal status. Thermal status may be directly measured or inferred by calculating an expected thermal level based on amount of transmitted power from a particular antenna. An over temperature state of the antenna is assigned a value of "1" with a value of "0" assigned if not over temperature. Another metric for antenna outage may be based on a current form factor of the communication device or user blocking of an antenna. When an antenna is compromised by the form factor or user blocking, a value of "1" is assigned, while a value of "0" is assigned if not blocked. In an example, certain antennas may be blocked when a communication device is folded or when held in a hand of a user. The blocking may be sensed and reported to controller 101 (FIG. 1). In an example, blocking detunes the affected antenna, which is detected by RF frontend 123 (FIG. 1). An additional metric is transmit power, which may be directly sensed or inferred from control states of transmit power control 131 (FIG. 1). A value of "1" is assigned, for example, if a particular antenna is operated within 3 dB of maximum power (Pmax) with a duty cycle of at least 50% of the time. Otherwise, a value of "0" is assigned. In a further example of an antenna outage metric, uplink block error ratio (BLER) or other measure of communication quality or user experience is evaluated. At least one threshold for BLER is set that is sufficiently low for mitigations such as error encoding and available data throughput to overcome without degradation. When additional data throughput it available, corrupted data can indicated as not received for being resent. Additional data throughput allows additional bits of data correction encoding that enables recovering corrupted data at the receiver. The value may be inferred based on historical data when evaluating an antenna switching configuration. A value of "1" is assigned if unable to stay within the BLER threshold and otherwise a value of "0" is assigned. In yet an additional example of an antenna outage metric, specific absorption rate or other regulatory transmit power cutbacks are applicable. A value of "1" can be assigned if a SAR cutback of more than 5 dB is required and otherwise a value of "0" is assigned.

TABLE B is an example of an evaluation table of transmit carrier priority that is computed by summing metrics for bearer type, anchor, latency, and data throughput. The weighting assigned to particular transmit characteristics in the metrics reflects expert assessments of the relative priority between different types of transmissions.

TABLE B

| Metric | Determine Transmit Carrier Priority | Example |
|---|---|---|
| Bearer type | 4 if Um active | T × 1 = 4 |
|  | 3 if both Am and Um active | T × 2 = 3 |
|  | 4 if Am active and Um not active | T × 3 = 3 |
| Anchor | 5 if MCG/PCC | T × 1 = 5 |
|  | 4 if SCG/SCC | T × 2 = 4 |
|  | 3 if SCC2 | T × 3 = 3 |
|  | 3 if Wi-Fi |  |
| Latency | 5 if latency-intensive app | T × 1 = 5 |
|  | 3 if not latency intensive app | T × 2 = 3 |
|  |  | T × 3 = 3 |
| Throughput | 4 if throughput intensive app | T × 1 = 2 |
|  | 2 if not throughput intensive app | T × 2 = 4 |
|  |  | T × 3 = 2 |
| QoS/5Qi | 5 if high priority class | T × 1 = 5 |
|  | 3 if lower priority class | T × 2 = 3 |
|  |  | T × 3 = 3 |
| PDN | 5 if IMS in emergency mode | T × 1 = 5 |
|  | 4 if IMS in regular mode (even if using different bearer types) | T × 2 = 3 |
|  |  | T × 3 = 3 |
|  | 3 if Internet with IMS |  |
|  | 5 if Internet without IMS |  |
| Sum of Metrics | Highest score = highest priority | T × 1 = 26 (highest priority) |
|  |  | T × 2 = 20 |
|  |  | T × 3 = 17 (lowest priority) |

In an example, for the metric of bearer type, a value of "4" may be assigned if unacknowledged mode (Um) is active, a value of "3" may be assigned if both acknowledged mode (AM) and Um is active, and a value of "4" may be assigned if Am is active and Um is not. In an additional example, a metric for carrier aggregation anchor may be used with a value "5" assigned if using master cell group (MCG) and primary cell channel (PCC), a value "4" if using secondary cell group (SCG) and secondary cell channel (SCC), a value of "3" if using second secondary cell channel (SCC2), and a value of "3" if using Wi-Fi. In an additional example, a metric for latency may be assigned with a value of "5" if an application is associated with being latency intensive and "3" if not. In yet another example, a metric for throughput may be assigned with a value of "4" if associated with high throughput and otherwise assigned a value of "2". In yet a further example, a communication quality for quality of service (QoS) or 5G quality "5QI" may be assigned with a value of "5" for a high quality class and a value of "3" for a lower quality class. In another example, a metric for a usage mode of a packet data network (PDN) may be assigned as: (i) "5" if using IP multimedia system (IMS) in emergency mode; (ii) "4" if using IMS in regular mode; (iii) "3" if using Internet with IMS; and (iv) "5" if using Internet without IMS. The transmit carrier having the highest sum of metric is the highest priority transmit carrier.

Figure 4A:
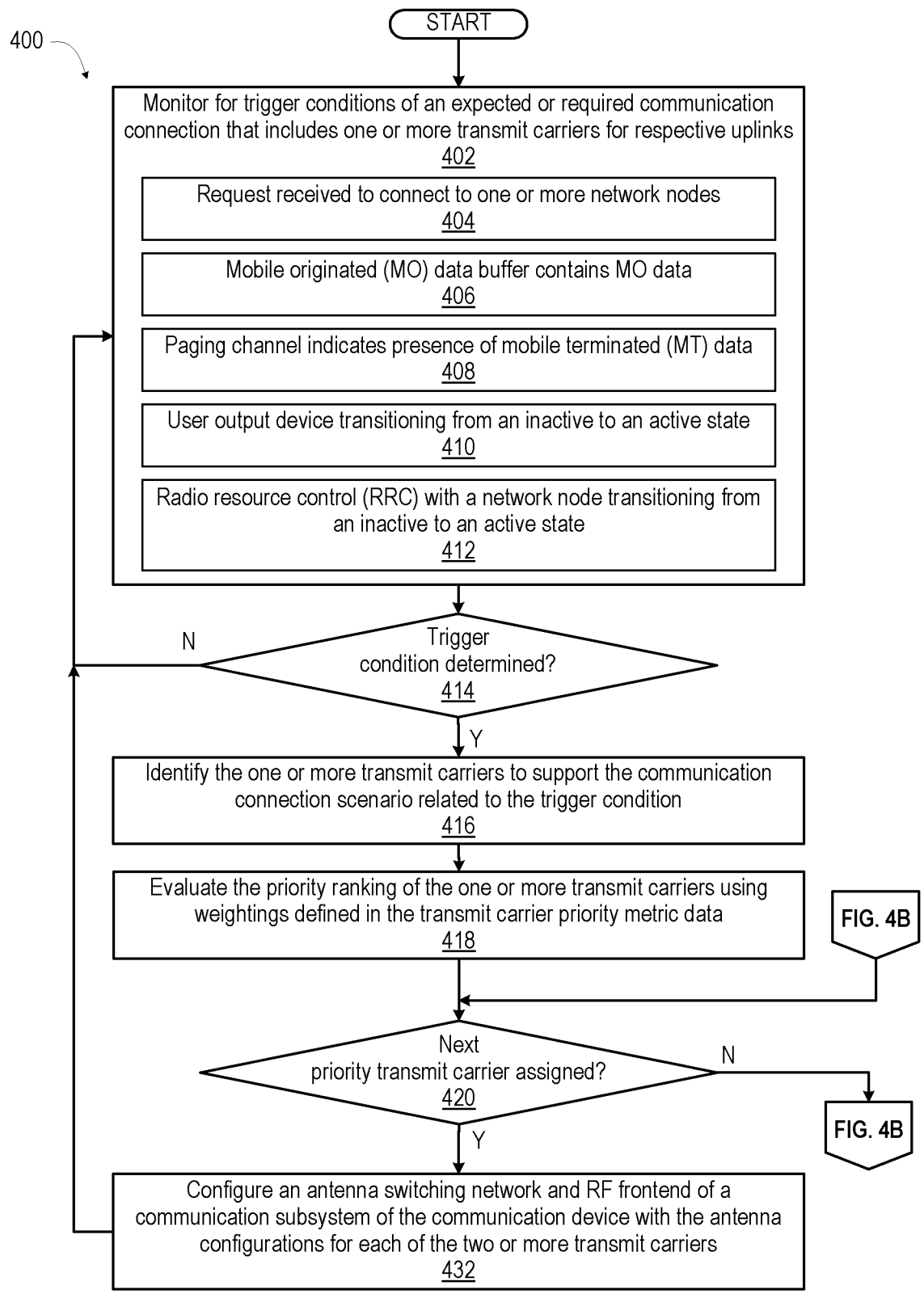
FIGS. 4A-4B (collectively FIG. 4) present a flow diagram of a method for dynamically evaluating and selecting a successful transmit antenna mode or configuration to minimize antenna outages for a priority transmit carrier in a multiple transmit carrier scenario, according to one or more embodiments.
Figure 4B:
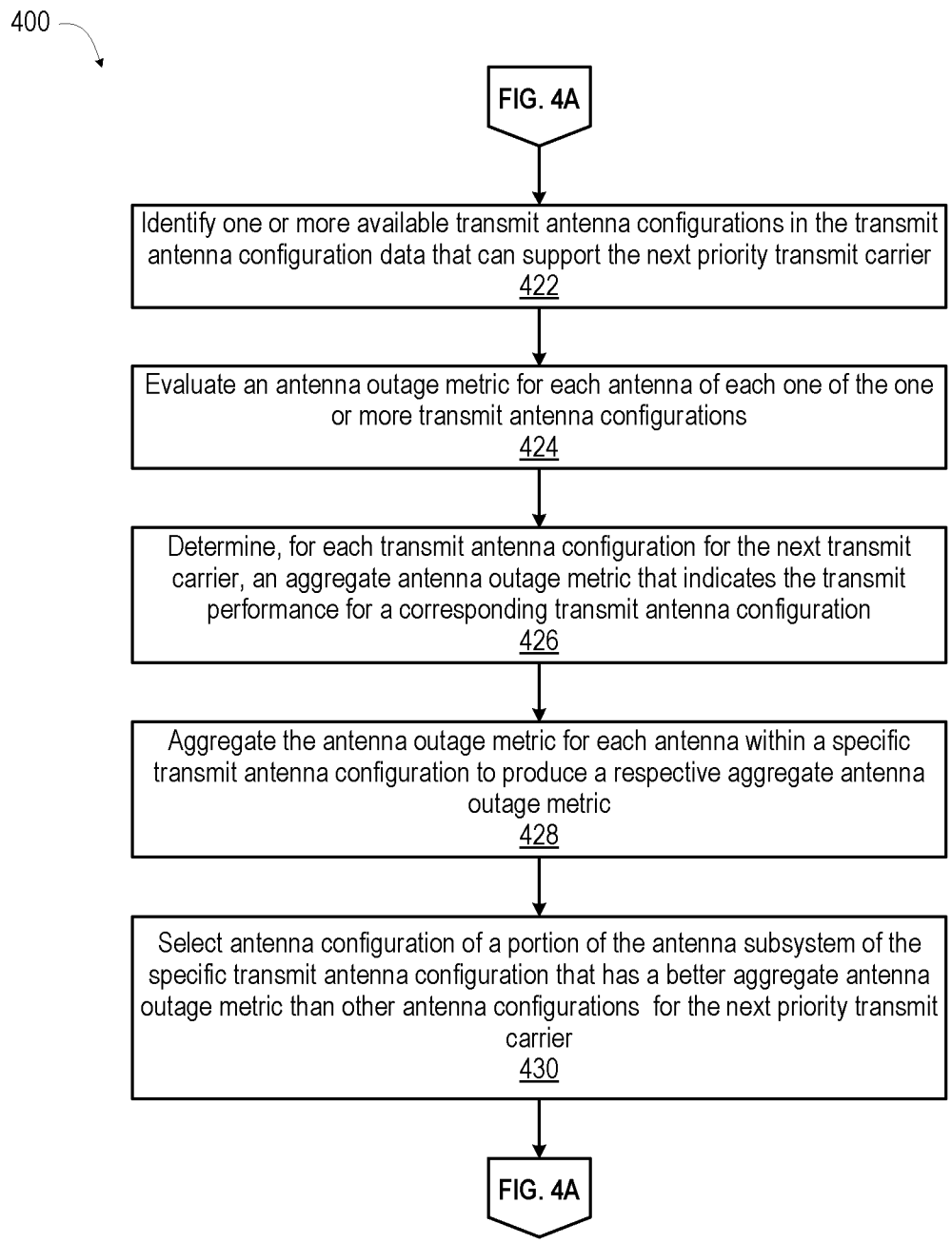

FIGS. 4A-4B (collectively FIG. 4) present a flow diagram of method 400 performed by a communication device for implementing a transmit antenna configuration to minimize antenna outages for multiple transmit carrier scenarios. The descriptions of method 400 is provided with general reference to the specific components illustrated within the preceding FIGS. 1-3, and specific components referenced in method 400 may be identical or similar to components of the same name used in describing preceding FIGS. 1-3. In one or more embodiments, controller 101 configures communication device 100 (FIG. 1) to provide functionality of method 400.

With reference to FIG. 4A, method 400 includes monitoring for trigger conditions of an expected or required communication connection that includes one or more transmit carriers for respective uplinks (block 402). In an example, one trigger is a request received to connect to one or more network nodes (block 404). In another example, one trigger is a mobile originated (MO) data buffer that contains MO data (block 406). In an additional example, one trigger is a paging channel that indicates presence of mobile terminated (MT) data (block 408). In a further example, one trigger is a user output device transitioning from an inactive to an active state (block 410). In an example, the communication device has a power saving mode in which a primary display device 162 (FIG. 1) is turned off when the user has not interacted with the display device 162 (FIG. 1) for a period of time. Presence of the user triggers display device 162 (FIG. 1) to turn on, such as due to detecting a touch or detecting proximity of a face of user to display device 162 (FIG. 1). In yet an additional example, one trigger is a radio resource control (RRC) with a network node transitioning from an inactive to an active state (block 412). The preparatory triggers of blocks 406, 408, 410, and 412 can reduce latency in handling mobile originated (MO) and mobile terminated (MT) traffic after connection by triggering preparation of the device for a connection by the communication subsystem before the connection is needed.

Method 400 includes determining whether one of the trigger condition is determined (decision block 414). In response to determining that one of the trigger conditions is not determined, method 400 returns to block 402. In response to determining that one of the trigger conditions is determined, method 400 includes identifying the one or more transmit carriers to support the communication connection scenario related to the trigger condition (block 416). In an example, the one or more multiple transmit carrier modes includes one of: (i) evolved universal terrestrial radio access network and new radio dual connectivity (ENDC); (ii) new radio intra-band uplink carrier aggregation (NR UL CA); (iii) new radio (NR) and IEEE-802.11 wireless; (iv) multi subscriber identity module (MSIM); (v) dual subscriber identity module dual active (DSDA); (vi) new radio dual connectivity (NRDC); and (vii) NR-E-UTRA dual connectivity (NEDC) with NR as anchor and LTE as secondary cell group (SCG). Method 400 includes evaluating the priority ranking of the one or more transmit carriers using weightings defined in the transmit carrier priority metric data (block 418). The weighting assigned to particular transmit characteristics in the metrics data reflects expert assessments of the relative priority between different types of transmissions. If only one transmit carrier is required, then the one transmit carrier is automatically the priority transmit carrier and antenna configuration is based on minimizing antenna outages for the one transmit carrier. Method 400 includes determining whether a next priority transmit carrier remains to be assigned to one or more antennas (decision block 420). In response to determining that there is a next priority transmit carrier that remains to be assigned to one or more antenna, then method 400 proceeds to block 422 (FIG. 4B).

With reference to FIG. 4B, method includes identifying one or more available transmit antenna configurations in the transmit antenna configuration data that can support the next priority transmit carrier (block 422). Method 400 includes evaluating an antenna outage metric for each antenna of each one of the one or more transmit antenna configurations (block 424). Method 400 includes determining, for each transmit antenna configuration for the next transmit carrier, an aggregate antenna outage metric that indicates the transmit performance for a corresponding transmit antenna configuration (block 426). In an example, method 400 includes determining the antenna outages of the antenna subsystem by determining thermal status of the antenna subsystem. A particular antenna element or array may be sensed as being too warm for use as a transmit antenna. In another example, method 400 includes determining the antenna outages of the antenna subsystem by determining form factor interference. Flip form factor or slide tray form factor can position antenna elements or arrays in close proximity in certain positions that limit use as a transmit antenna. In an additional example, method 400 includes determining the antenna outages of the antenna subsystem by determining user blocking. How a person holds the communication device or places the communication device near to skin of the person can limit antenna efficiency. In a further example, method 400 includes determining the antenna outages of the antenna subsystem by determining transmit power limit. The communication device can have transmit limits imposed by the capabilities of the communication subsystem for particular antennas. In yet another example, method 400 includes determining the antenna outages of the antenna subsystem by determining uplink block error ratio (BLER) measurement. Quality of the transmission is indicated by the BLER measurement. In yet an additional example, method 400 includes determining the antenna outages of the antenna subsystem by determining a regulatory cutback. Certain power limits at particular transmit frequencies may be proscribed to avoid interference or to mitigate exposure to RF signals. Method 400 includes aggregating the antenna outage metric for each antenna within a specific transmit antenna configuration to produce a respective aggregate antenna outage metric (block 428). Method 430 includes selecting an antenna configuration of a portion of the antenna subsystem of the specific transmit antenna configuration that has a better aggregate antenna outage metric than other antenna configurations for the next priority transmit carrier (block 430). Then method 400 returns to decision block 420 (FIG. 4A). In response to determining that there is not a next priority transmit carrier that remains to be assigned to one or more antenna, then method 400 includes configuring an antenna switching network and RF frontend of a communication subsystem of the communication device with the antenna configurations previously selected for each of the two or more transmit carriers (block 432). Then method 400 returns to block 402.

Aspects of the present innovation are described above with reference to flowchart illustrations and/or block diagrams of methods, apparatus (systems) and computer program products according to embodiments of the innovation.

It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
   a communication subsystem comprising:
   an antenna subsystem comprising two or more radio frequency (RF) antennas that are communicatively connected to an antenna switching network;
   an RF frontend communicatively connected to the antenna subsystem via the antenna switching network and having more than one modem configurable for one or more multiple transmit carrier modes;
   a communication module that dynamically configures the antenna switching network, the RF frontend, and the antenna subsystem to communicate using the one or more multiple transmit carrier modes;
   a memory that stores transmit antenna configuration data; and
   a controller communicatively coupled to the communication subsystem and the memory and which:
   determines a first transmit carrier, of at least two transmit carriers of a multiple transmit carrier mode, that is identified as having priority among the at least two transmit carriers;
   identifies one or more transmit antenna configurations in the transmit antenna configuration data that support the first transmit carrier;
   determines, for each transmit antenna configuration, an aggregate antenna outage metric that indicates transmit performance for a corresponding transmit antenna configuration; and
   configures the communication subsystem with a first transmit antenna configuration that has a better aggregate antenna outage metric than other antenna configurations.

2. The communication device of claim 1, wherein:
   the memory stores transmit carrier priority data comprising metrics assigned for one or more of: (i) bearer type; (ii) anchor type; (iii) application latency intensity; (iv) application throughput intensity; (v) quality of service class; (vi) and a usage mode of a packet data network; and
   the controller references the transmit carrier priority data to determine the first transmit carrier, of at least two transmit carriers of the multiple transmit carrier mode, that is identified as having the priority among the at least two transmit carriers.

3. The communication device of claim 1, wherein, to determine the aggregate antenna outage metric, the controller:
   evaluates an antenna outage metric for each antenna of each one of the one or more transmit antenna configurations; and
   aggregates the antenna outage metric for each antenna within a specific transmit antenna configuration to produce the respective aggregate antenna outage metric.

4. The communication device of claim 1, wherein the controller:
   determines a second transmit carrier of the at least two transmit carriers that is identified as having a second highest priority among the at least two transmit carriers comprising metrics assigned for one or more of: (i) bearer type; (ii) anchor type; (iii) application latency intensity; (iv) application throughput intensity; (v) quality of service class; (vi) and a usage mode of a packet data network;
   identifies one or more antenna configurations in the transmit antenna configuration data that support the second transmit carrier and that remain available after transmit antenna assignment for the first transmit carrier;

determines a second aggregate antenna outage metric that indicates the transmit performance for each transmit antenna configuration for the second transmit carrier; and configures the communication subsystem with a second transmit antenna configuration having a second aggregate antenna outage metric that is better than other antenna configurations for the second transmit carrier.

5. The communication device of claim 1, wherein the one or more multiple transmit carrier modes comprises one of: (i) evolved universal terrestrial radio access network and new radio dual connectivity (ENDC); (ii) new radio intra-band uplink carrier aggregation (NR UL CA); (iii) new radio (NR) and IEEE-802.11 wireless; (iv) multi subscriber identity module (MSIM); (v) dual subscriber identity module dual active (DSDA); (vi) new radio dual connectivity (NRDC); and (vii) NR-E-UTRA dual connectivity (NEDC).

6. The communication device of claim 1, wherein the controller determines antenna outages of the antenna subsystem by determining one or more of: (i) thermal status of the antenna subsystem; (ii) form factor interference; (iii) user blocking; (iv) transmit power limit; (v) uplink block error ratio measurement; and (vi) a regulatory cutback.

7. The communication device of claim 1, wherein:
the memory stores at least one application and a mobile originated (MO) data buffer; and
the controller:
determines whether the at least one application has stored MO data in the MO data buffer that is awaiting communication by one of the multiple transmit carrier mode; and
in response to determining that the at least one application has stored MO data in the MO data buffer, triggers the determining of the aggregate antenna outage metric that indicates the transmit performance for each transmit antenna configuration in preparation for a connection by the communication subsystem.

8. The communication device of claim 1, wherein the controller:
determines whether a paging channel monitored by the communication subsystem indicates presence of mobile terminated (MT) data awaiting communication to the communication device; and
in response to determining that the paging channel indicates presence of MT data, triggers the determining of the aggregate antenna outage metric that indicates the transmit performance for each transmit antenna configuration in preparation for a connection by the communication subsystem.

9. The communication device of claim 1, further comprising a user interface device communicatively coupled to the controller that, and the controller, in response to determining that the user interface device is transitioning from an inactive state to an active state, triggers the determining of the aggregate antenna outage metric that indicates the transmit performance for each transmit antenna configuration in preparation for a connection by the communication subsystem.

10. The communication device of claim 1, wherein the controller:
monitors radio resource control (RRC) state transitions between the communication subsystem and a network node; and
in response to determining that the RRC state is transitioning from an inactive state to an active state, triggers the determining of the aggregate antenna outage metric that indicates the transmit performance for each transmit antenna configuration in preparation for a connection by the communication subsystem.

11. A method comprising:
determining a first transmit carrier, of at least two transmit carriers of a multiple transmit carrier mode, that is identified as having priority among the at least two transmit carriers;
identifying one or more transmit antenna configurations in transmit antenna configuration data that support the first transmit carrier;
determining, for each transmit antenna configuration, an aggregate antenna outage metric that indicates transmit performance for a corresponding transmit antenna configuration; and
configuring an antenna switching network and RF frontend of a communication subsystem of a communication device with a first transmit antenna configuration that has a better aggregate antenna outage metric than other antenna configurations.

12. The method of claim 11, further comprising referencing transmit carrier priority data to determine the first transmit carrier comprising metrics assigned for one or more of: (i) bearer type; (ii) anchor type; (iii) application latency intensity; (iv) application throughput intensity; (v) quality of service class; (vi) and a usage mode of a packet data network, of at least two transmit carriers of the multiple transmit carrier mode, that is identified as having the priority among the at least two transmit carriers.

13. The method of claim 11, wherein determining the aggregate antenna outage metric comprises:
evaluating an antenna outage metric for each antenna of each one of the one or more transmit antenna configurations; and
aggregating the antenna outage metric for each antenna within a specific transmit antenna configuration to produce the respective aggregate antenna outage metric.

14. The method of claim 11, further comprising:
determining a second transmit carrier of the at least two transmit carriers that is identified as having a second highest priority among the at least two transmit carriers comprising metrics assigned for one or more of: (i) bearer type; (ii) anchor type; (iii) application latency intensity; (iv) application throughput intensity; (v) quality of service class; (vi) and a usage mode of a packet data network;
identifying one or more antenna configurations in the transmit antenna configuration data that support the second transmit carrier and that remain available after transmit antenna assignment for the first transmit carrier;
determining a second aggregate antenna outage metric that indicates the transmit performance for each transmit antenna configuration for the second transmit carrier; and
configuring the communication subsystem with a second transmit antenna configuration having a second aggregate antenna outage metric that is better than other antenna configurations for the second transmit carrier.

15. The method of claim 11, wherein the one or more multiple transmit carrier modes comprises one of: (i) evolved universal terrestrial radio access network and new radio dual connectivity (ENDC); (ii) new radio intra-band uplink carrier aggregation (NR UL CA); (iii) new radio (NR) and IEEE-802.11 wireless; (iv) multi subscriber identity module (MSIM); and (v) dual subscriber identity module dual active (DSDA); (vi) new radio dual connectivity (NRDC); and (vii) NR-E-UTRA dual connectivity (NEDC).

16. The method of claim 11, wherein determining the antenna outages of the antenna subsystem comprises determining one or more of: (i) thermal status of the antenna subsystem; (ii) form factor interference; (iii) user blocking; (iv) transmit power limit; (v) uplink block error ratio measurement; and (vi) a regulatory cutback.

17. The method of claim 11, further comprising:
determines whether a mobile originated (MO) data buffer contains MO data that is awaiting communication by one of the multiple transmit carrier mode; and
in response to determining that the MO data buffer contains MO data, triggering the determining of the aggregate antenna outage metric that indicates the transmit performance for each transmit antenna configuration in preparation for a connection by the communication subsystem.

18. The method of claim 11, further comprising:
determining whether a paging channel monitored by the communication subsystem indicates presence of mobile terminated (MT) data awaiting communication to the communication device; and
in response to determining that the paging channel indicates presence of MT data, triggering the determining of the aggregate antenna outage metric that indicates the transmit performance for each transmit antenna configuration in preparation for a connection by the communication subsystem.

19. The method of claim 11, further comprising:
in response to determining that a user interface device of the communication device is transitioning from an inactive state to an active state, triggering the determining of the aggregate antenna outage metric that indicates the transmit performance for each transmit antenna configuration in preparation for a connection by the communication subsystem; and
in response to determining that radio resource control (RRC) state is transitioning from an inactive state to an active state, triggering the determining of the aggregate antenna outage metric that indicates the transmit performance for each transmit antenna configuration in preparation for a connection by the communication subsystem.

20. A computer program product comprising:
a computer readable storage device; and
program code on the computer readable storage device that when executed by a processor associated with a communication device, the program code enables the communication device to provide functionality of:
determining a first transmit carrier, of at least two transmit carriers of a multiple transmit carrier mode, that is identified as having priority among the at least two transmit carriers;
identifying one or more transmit antenna configurations in transmit antenna configuration data that support the first transmit carrier;
determining, for each transmit antenna configuration, an aggregate antenna outage metric that indicates transmit performance for a corresponding transmit antenna configuration; and
configuring an antenna switching network and RF frontend of a communication subsystem of the communication device with a first transmit antenna configuration that has a better aggregate antenna outage metric than other antenna configurations.

\* \* \* \* \*